(12) United States Patent
Kim et al.

(10) Patent No.: US 11,686,620 B2
(45) Date of Patent: *Jun. 27, 2023

(54) SPECTRAL IMAGING APPARATUS

(71) Applicant: SAMSUNG ELECTRONICS CO., LTD., Suwon-si (KR)

(72) Inventors: Hyochul Kim, Yongin-si (KR); Younggeun Roh, Seoul (KR); Yeonsang Park, Seoul (KR); Suyeon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

This patent is subject to a terminal disclaimer.

(21) Appl. No.: 17/501,496

(22) Filed: Oct. 14, 2021

(65) Prior Publication Data
US 2022/0065696 A1    Mar. 3, 2022

Related U.S. Application Data

(63) Continuation of application No. 16/713,131, filed on Dec. 13, 2019, now Pat. No. 11,175,182.

(30) Foreign Application Priority Data

Aug. 14, 2019    (KR) .......................... 10-2019-0099830

(51) Int. Cl.
*G01J 3/28* (2006.01)
*G02B 5/20* (2006.01)

(52) U.S. Cl.
CPC ............ *G01J 3/2823* (2013.01); *G02B 5/201* (2013.01)

(58) Field of Classification Search
CPC .............................. G01J 3/2823; G02B 5/201
See application file for complete search history.

(56) References Cited

U.S. PATENT DOCUMENTS

| | | | |
|---|---|---|---|
| 8,629,930 B2 | 1/2014 | Brueckner et al. | |
| 9,772,229 B2 | 9/2017 | Geelen et al. | |
| 9,857,222 B2 | 1/2018 | Geelen et al. | |
| 2005/0068541 A1 | 3/2005 | Gunning et al. | |
| 2007/0012860 A1 | 1/2007 | Mahgerefteh et al. | |
| 2014/0267849 A1 | 9/2014 | Geelen et al. | |
| 2015/0144770 A1 | 5/2015 | Choi | |
| 2015/0276478 A1 | 10/2015 | Geelen et al. | |
| 2017/0145498 A1 | 5/2017 | Saxena et al. | |
| 2018/0359460 A1 | 12/2018 | Pacala et al. | |

(Continued)

FOREIGN PATENT DOCUMENTS

| | | |
|---|---|---|
| JP | 2015-95546 A | 5/2015 |
| KR | 10-2011-0074984 A | 7/2011 |
| KR | 10-2018-0015067 A | 2/2018 |

*Primary Examiner* — Jamil Ahmed
(74) *Attorney, Agent, or Firm* — Sughrue Mion, PLLC

(57) ABSTRACT

Provided is a spectral imaging apparatus. The spectral imaging apparatus includes: an optical filter including a plurality of band filter units having different center wavelengths; a sensing device configured to receive light passing through the optical filter; an imaging lens array including a plurality of lens units which respectively correspond to the plurality of band filter units and each implement imaging on the sensing device; and a transparent substrate which is apart from the sensing device. At least one of the optical filter and the imaging lens array is provided on the transparent substrate.

14 Claims, 23 Drawing Sheets

(56) References Cited

U.S. PATENT DOCUMENTS

| | | |
|---|---|---|
| 2019/0004222 A1 | 1/2019 | Hwang et al. |
| 2019/0064355 A1 | 2/2019 | Pacala et al. |
| 2019/0232708 A1* | 8/2019 | Holmes ................ B42D 25/373 |
| 2019/0273875 A1 | 9/2019 | Kester et al. |
| 2021/0033466 A1 | 2/2021 | Kim et al. |

* cited by examiner

SPECTRAL IMAGING APPARATUS

CROSS-REFERENCE TO RELATED APPLICATION

This application is a continuation of U.S. patent application Ser. No. 16/713,131, filed on Dec. 13, 2019, which claims priority from Korean Patent Application No. 10-2019-0099830, filed on Aug. 14, 2019, in the Korean Intellectual Property Office, the disclosures of which are incorporated herein in their entireties by reference.

BACKGROUND

1. Field

One or more example embodiments of the disclosure relate to a spectral imaging apparatus.

2. Description of the Related Art

A spectrometer is one of important tools in optical applications. Spectrometers of the related art are constituted by various optical elements and are thus bulky and heavy. Recently, as small spectrometers are required, research has been conducted to provide integrated circuits and optical devices on a single semiconductor chip.

A small, high-resolution spectrometer may be realized by providing an image sensor with an optical filter which includes band filter units having different center wavelengths. In addition, an imaging lens for forming the focus of images of an object on the image sensor may be arranged on the optical filter to realize a spectral imaging apparatus (e.g., spectral camera).

SUMMARY

One or more example embodiments provide a spectral imaging apparatus (e.g., a spectral camera).

Additional aspects will be set forth in part in the description which follows and, in part, will be apparent from the description, or may be learned by practice of the example embodiments of the disclosure.

According to an aspect of an example embodiment, a spectral imaging apparatus includes:

an optical filter including a plurality of band filter units having different center wavelengths;

a sensing device configured to receive light passing through the optical filter;

an imaging lens array including a plurality of lens units which respectively correspond to the plurality of band filter and a transparent substrate which is apart from the sensing device, wherein at least one of the optical filter and the imaging lens array is provided on the transparent substrate.

The optical filter and the imaging lens array may be provided on the transparent substrate.

The optical filter may be provided on a first surface of the transparent substrate, and the imaging lens array may be provided on a second surface of the transparent substrate, the second surface being opposite to the first surface.

The optical filter and the imaging lens array may be provided on a surface of the transparent substrate.

The spectral imaging apparatus may further include an intermediate layer provided between the optical filter and the imaging lens array.

One of the optical filter and the imaging lens array may be provided on the transparent substrate, and another one of the optical filter and the imaging lens array may be provided on the sensing device.

The spectral imaging apparatus may further include an additional filter which is provided on the sensing device or the transparent substrate and includes a plurality of additional filter units, the plurality of additional filter units respectively corresponding to the plurality of band filter units and configured to transmit specific wavelength bands. The plurality of additional filter units may include a plurality of color filter units or a plurality of broadband filter units.

Each of the plurality of lens units may include at least one convex lens.

Each of the plurality of lens units may include a flat lens or a meta lens.

Each of the plurality of band filter units may include: a cavity layer; and Bragg reflection layers respectively provided on an upper surface and a lower surface of the cavity layer.

The cavity layer may include a single material layer or a plurality of material layers having different refractive indexes.

The cavity layer may have a thickness greater than $\lambda/n$, where $\lambda$ refers to a center wavelength of a corresponding band filter unit, and n refers to an effective refractive index of the cavity layer.

The Bragg reflection layers may include at least three material layers having different refractive indexes.

Each of the plurality of band filter units may have a photonic crystal structure or a nano-post structure.

The spectral imaging apparatus may further include a light blocking layer provided between the plurality of lens units.

The sensing device may include an image sensor or a photodiode.

According to an aspect of an example embodiment, a spectral imaging apparatus includes:

an optical filter including a plurality of band filter units having different center wavelengths;

a sensing device configured to receive light passing through the optical filter; and an imaging lens array including a plurality of lens units which respectively correspond to the plurality of band filter units, wherein the optical filter and the imaging lens array may be monolithically provided on the sensing device.

The spectral imaging apparatus may further include an additional filter which is monolithically provided on the sensing device and includes a plurality of additional filter units, the plurality of additional filter units corresponding to the plurality of band filter units and configured to transmit specific wavelength bands.

Each of the plurality of lens units may include at least one of a convex lens, a flat lens, or a meta lens.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
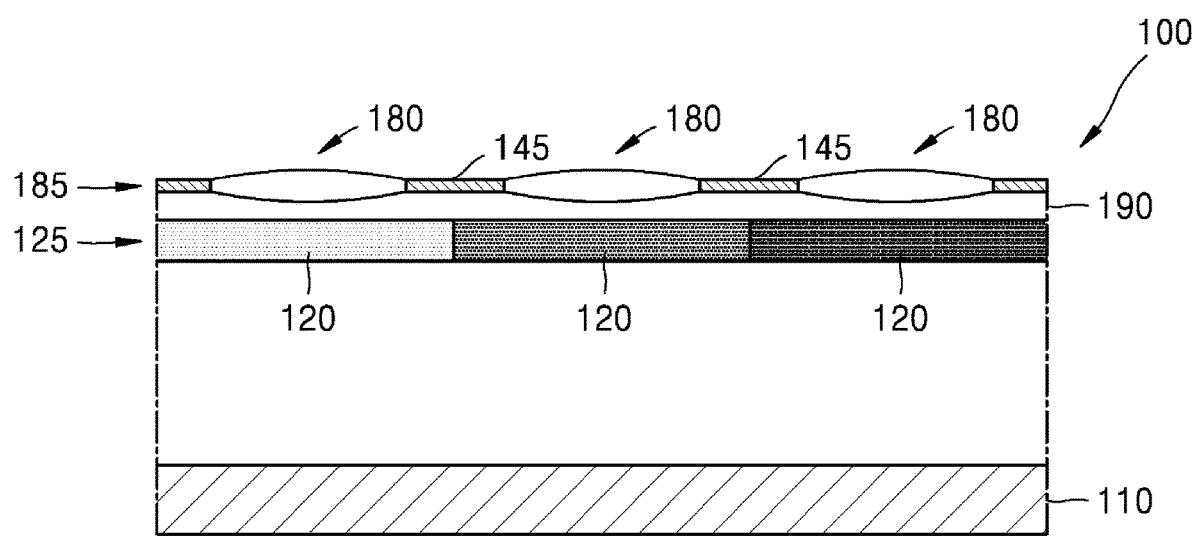
FIG. 1 is a cross-sectional view illustrating a spectral imaging apparatus according to an example embodiment.

Reference will now be made in detail to example embodiments, which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described with reference to the accompanying drawings. In the drawings, the sizes of elements may be exaggerated for clarity of illustration. The example embodiments described herein are for illustrative purposes only, and various modifications may be made therein.

In the following description, when an element is referred to as being "above" or "on" another element, it may be directly on the other element while making contact with the other element or may be above the other element without making contact with the other element. The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even if it has a singular form. Operations of a method may be performed in appropriate order unless explicitly described in terms of order or described to the contrary. That is, operations are not limited to the order in which the operations are described. Examples or exemplary terms are just used herein to describe technical ideas and should not be considered for purposes of limitation unless defined by the claims.

FIG. 1 is a cross-sectional view illustrating a spectral imaging apparatus 100 according to an example embodiment. In FIG. 1, only a portion of the spectral imaging apparatus 100 is shown for ease of illustration, and this will be applied to the following description.

Referring to FIG. 1, the spectral imaging apparatus 100 (e.g., a spectral camera) includes a sensing device 110, an optical filter 125, and an imaging lens array 185. Here, the optical filter 125 and the imaging lens array 185 are provided on a transparent substrate 190, which is apart from the sensing device 110.

The sensing device 110 may receive light passing through the imaging lens array 185 and the optical filter 125 and may convert the light into an electrical signal. For example, the sensing device 110 may include a photodiode or an image sensor such as a charge-coupled device (CCD) image sensor or a complementary metal-oxide semiconductor (CMOS) image sensor. However, these are non-limiting examples.

The transparent substrate 190 is provided above the sensing device 110 at a distance from the sensing device 110. For example, a glass substrate, a quartz substrate, a sapphire substrate, or the like may be used as the transparent substrate 190, but the transparent substrate 190 is not limited thereto.

The optical filter 125, which includes a plurality of band filter units 120, is provided on a lower surface of the transparent substrate 190. Here, the band filter units 120 may be two-dimensionally arranged on the lower surface of the transparent substrate 190. However, this is an example, and the band filter units 120 may be arranged in a one-dimensional form.

The band filter units 120 may have different center wavelengths. Each of the band filter units 120 may be provided to transmit light in a specific wavelength band including a center wavelength. FIG. 1 illustrates an example which three band filter units 120 having different center wavelengths are provided on the lower surface of the transparent substrate 190.

Figure 2:
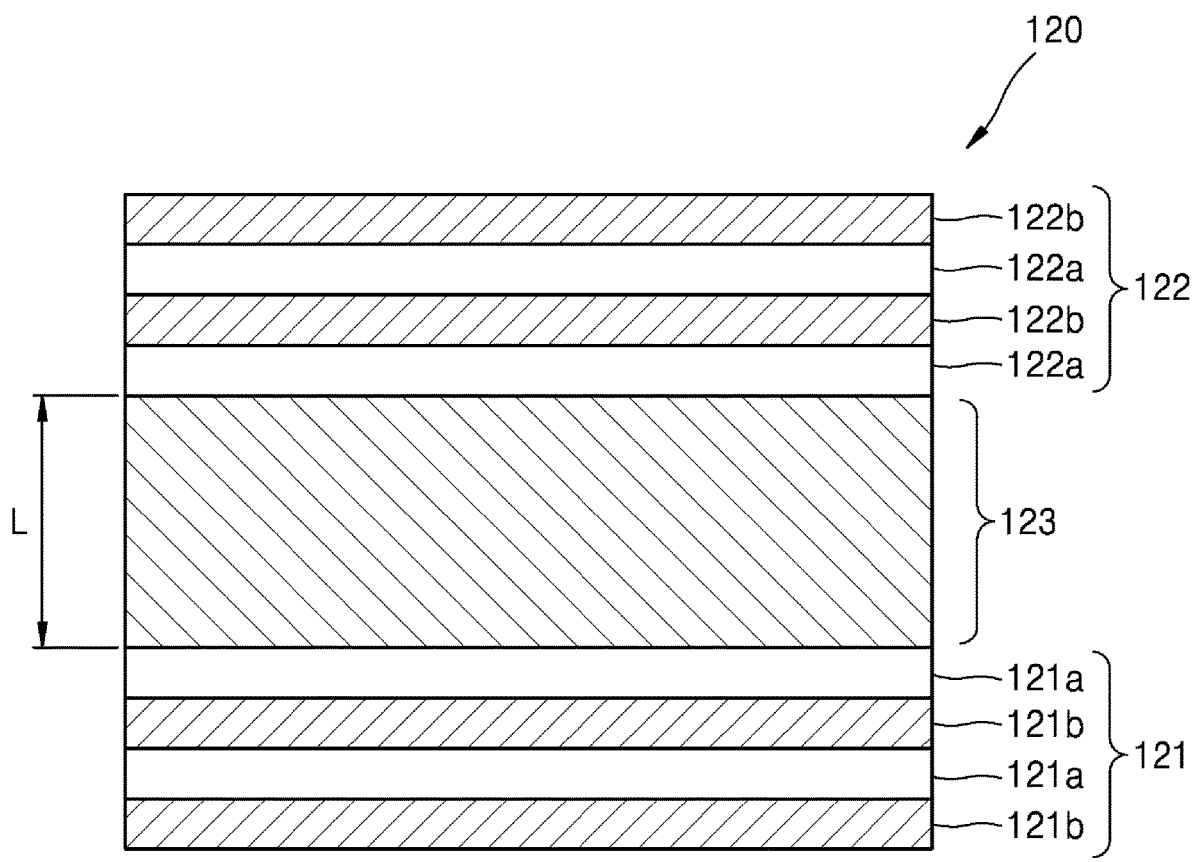
FIG. 2 is a cross-sectional view illustrating a band filter unit of an optical filter illustrated in FIG. 1.

FIG. 2 is a cross-sectional view illustrating a band filter unit 120 of the optical filter 125 illustrated in FIG. 1.

Referring to FIG. 2, the band filter unit 120 transmits a wavelength band having a center wavelength and has a Fabry-Perot structure in which a resonance layer (cavity layer) is provided between two reflection layers. Here, the center wavelength and the wavelength band of light passing through the band filter unit 120 may be determined according to the reflection band of the reflection layers and the characteristics of the cavity layer.

The band filter unit 120 includes: first and second Bragg reflection layers 121 and 122, which are apart from each other; and a cavity layer 123 provided between the first and second Bragg reflection layers 121 and 122.

The cavity layer 123, which is a resonance layer, may include a semiconductor material having a predetermined refractive index. For example, the cavity layer 123 may include silicon or a silicon oxide. However, this is merely an example, and the cavity layer 123 may include various other materials depending on design conditions such as the wavelength of incident light. The cavity layer 123 may include a single material layer (or a layer comprising a single material) or a plurality of material layers having different refractive indexes.

The intensity of light output from the band filter unit 120 may vary according to the angle of incidence of the light on the band filter unit 120. The cavity layer 123 may have a thickness equal to or greater than a certain value to reduce the dependency on the angle of incidence of light to the cavity layer 123. The cavity layer 123 may have a thickness L greater than $\lambda/n$ (where $\lambda$ refers to the center wavelength of the band filter unit 120 and n refers to the effective refractive index of the cavity layer 123). As described above, when the thickness L of the cavity layer 123 is greater than $\lambda/n$, the band filter unit 120 may transmit light having a specific center wavelength and a desired degree of intensity even if light is incident on the band filter unit 120 at various angles.

The first and second Bragg reflection layers 121 and 122 respectively provided on lower and upper surfaces of the cavity layer 123 may be distributed Bragg reflectors (DBRs). The first Bragg reflection layer 121 has a structure in which at least one first material layer 121a and at least one second material layer 121b are stacked in a vertical direction. FIG. 2 illustrates an example structure in which two first material layers 121a and two second material layers 121b are alternately stacked in the vertical direction. However, this is merely an example, and the numbers of first and second material layers 121a and 121b may be variously selected.

The first and second material layers 121a and 121b may include materials having different refractive indexes. For example, the first material layer 121a may have a relatively high refractive index, and the second material layer 121b may have a relatively low refractive index. For example, the first material layer 121a may include silicon, and the second material layer 121b may include a silicon oxide. Here, the silicon may have a refractive index of about 3.0 or greater, and the silicon oxide may have a refractive index of about 1.4 to about 1.5.

Like the first Bragg reflection layer 121, the second Bragg reflection layer 122 has a structure in which at least one first material layer 122a and at least one second material layer 122b are alternately stacked in the vertical direction. The first and second material layers 122a and 122b may include materials having different refractive indexes.

Figure 3:
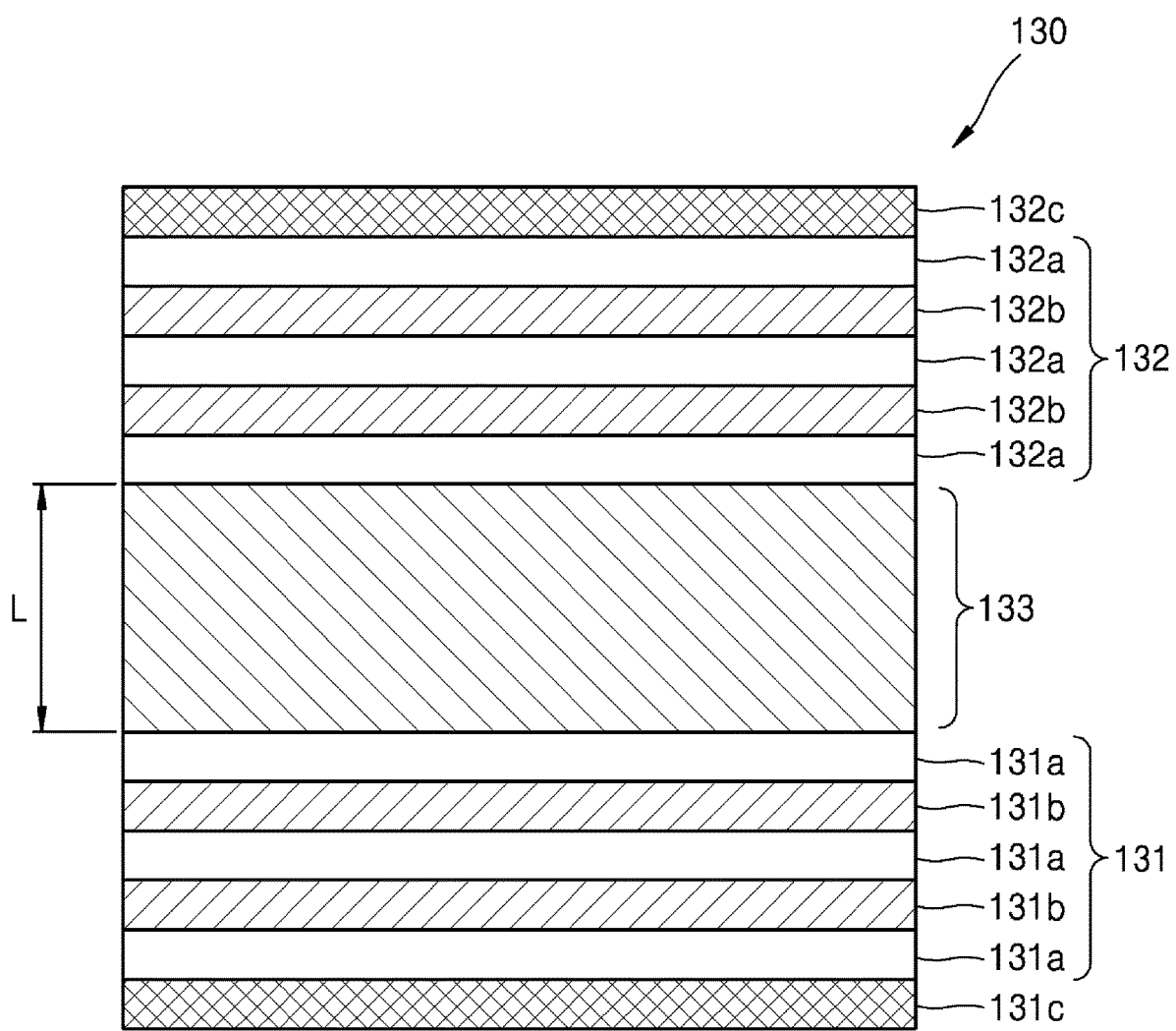
FIG. 3 is a cross-sectional view illustrating another band filter unit that is applicable to the optical filter illustrated in FIG. 1.

FIG. 3 is a cross-sectional view illustrating another band filter unit 130 that is applicable to the optical filter 125 illustrated in FIG. 1.

Referring to FIG. 3, the band filter unit 130 includes: first and second Bragg reflection layers 131 and 132 that are apart from each other; and a cavity layer 133 between the first and second Bragg reflection layers 131 and 132.

As described above, the cavity layer 133 may have a thickness equal to or greater than a certain value to reduce the dependency on the angle of incidence of light to the band filter unit 130. The cavity layer 133 may have a thickness L greater than $\lambda/n$ (where $\lambda$ refers to the center wavelength of the band filter unit 130 and n refers to the effective refractive index of the cavity layer 133). As described above, when the thickness L of the cavity layer 133 is greater than $\lambda/n$, the band filter unit 130 may transmit light having a specific center wavelength and a desired degree of intensity even if light is incident on the band filter unit 130 at various angles.

Each of the first and second Bragg reflection layers 131 and 132 respectively provided on lower and upper surfaces of the cavity layer 133 may include three kinds of material layers having different refractive indexes. The first Bragg reflection layer 131 has a structure in which at least one first material layer 131a, at least one second material layer 131b, and at least one third material layer 131c are vertically stacked. FIG. 3 illustrates an example structure in which three first material layers 131a and two second material layers 131b are alternately stacked in a vertical direction on an upper surface of the third material layer 131c. However, this is merely an example, and the numbers and arrangement of the first, second, and third material layers 131a, 131b, and 131c may be variously modified.

The first, second, and third material layers 131a, 131b, and 131c may include materials having different refractive indexes. For example, the first material layer 131a may have the greatest refractive index, and the second material layer 131b may have the lowest refractive index. In addition, the third material layer 131c may have a refractive index less than the refractive index of the first material layer 131a but greater than the refractive index of the second material layer 131b.

For example, the first material layer 131a may include silicon, and the second material layer 131b may include a silicon oxide. In addition, the third material layer 131c may include a titanium oxide or silicon nitride. Here, the silicon may have a refractive index of about 3.0 or greater, the silicon oxide may have a refractive index of about 1.4 to about 1.5, and the titanium oxide or silicon nitride may have a refractive index of about 1.9 to about 3.0.

Like the first Bragg reflection layer 131, the second Bragg reflection layer 132 has a structure in which at least one first material layer 132a, at least one second material layer 132b, and at least one third material layer 132c are vertically stacked. FIG. 3 illustrates an example structure in which three first material layers 132a and two second material layers 132b are alternately stacked in the vertical direction on a lower surface of the third material layer 132c. However, this is a non-limiting example, and the numbers and arrangement of the first, second, and third material layers 132a, 132b, and 132c may be variously modified.

The first, second, and third material layers 132a, 132b, and 132c may include materials having different refractive indexes. For example, the first material layer 132a may have the greatest refractive index, and the second material layer 131b may have the lowest refractive index. In addition, the third material layer 132c may have a refractive index less than the refractive index of the first material layer 132a but greater than the refractive index of the second material layer 132b.

The first and second Bragg reflection layers 131 and 132 each include three kinds of material layers, that is, the first material layers 131a and 132a, the second material layers 131b and 132b, and the third material layers 131c and 132c, and thus the width (for example, full width at half maximum (FWHM)) of a wavelength band passing through the band filter unit 130 may be adjusted to a desired value.

In the band filter unit 120 illustrated in FIG. 2, two first material layers 121a or 122a and two second material layers 121b or 122b having different refractive indexes and alternately stacked are used as each Bragg reflection layer. Here, a wavelength band width is determined by adjusting the numbers of first material layers 121a and 122a and second material layers 121b and 122b. For example, when the numbers of first material layers 121a, first material layers 122a, second material layers 121b, second material layers 122b are each n (n being an integer equal to or greater than 1), a wavelength band width w1 may be obtained, and when the numbers thereof are each n+1, a wavelength band width w2 may be obtained.

In the band filter unit 130 illustrated in FIG. 3, the first and second Bragg reflection layers 131 and 132 each include three kinds of material layers having different refractive indexes: the first material layers 131a and 132a, the second material layers 131b and 132b, and the third material layers 131c and 132c, and thus a wavelength band width which ranges between w1 and w2 may be realized by adjusting the numbers of the first, second, and third material layers 131a, 132a, 131b, 132b, 131c, and 132c.

Figure 4:
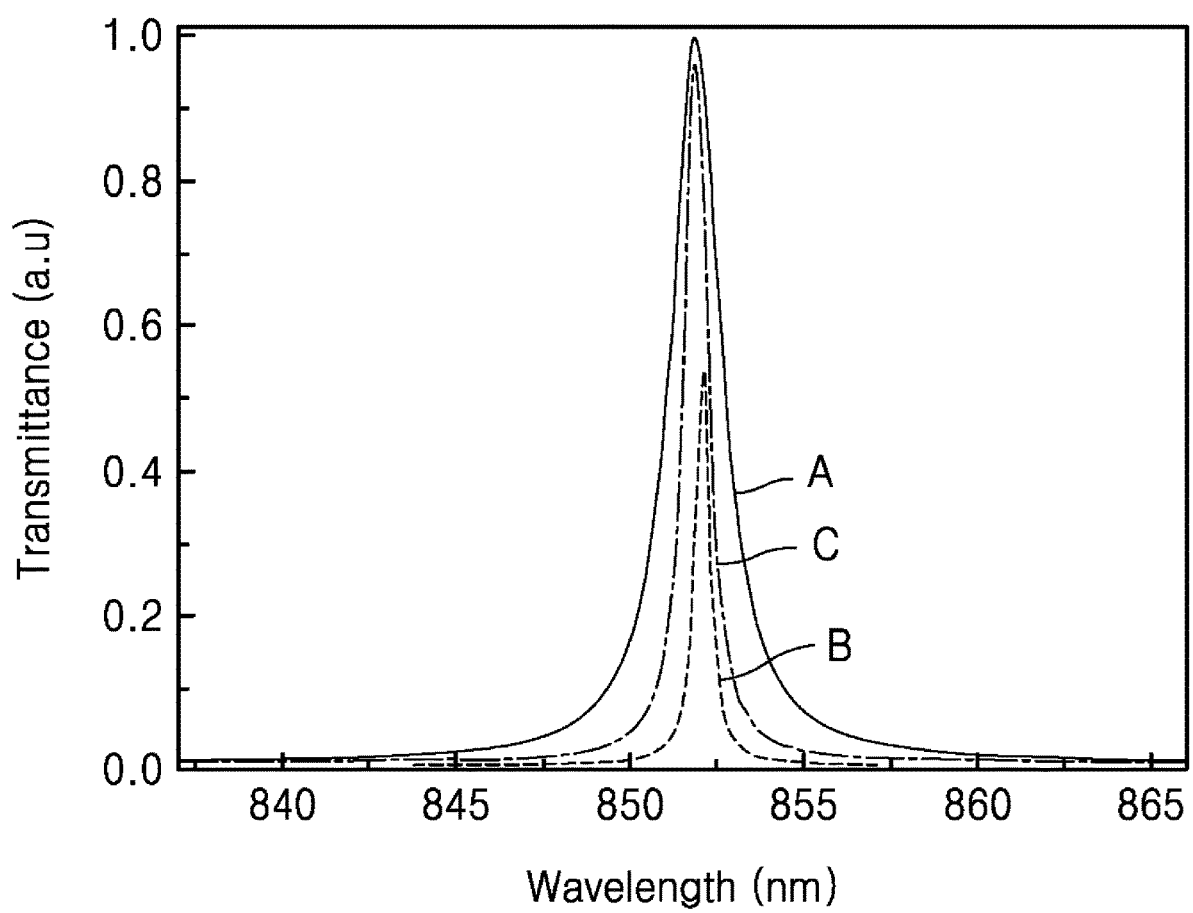
FIG. 4 is a graph illustrating a transmission spectrum of the band filter unit illustrated in FIG. 2 and a transmission spectrum of the band filter unit illustrated FIG. 3.

FIG. 4 is a graph illustrating a transmission spectrum of the band filter unit 120 illustrated in FIG. 2 and a transmission spectrum of the band filter unit 130 illustrated FIG. 3. Here, in this embodiment, silicon and a silicon oxide are respectively used to form the first material layers 121a, 122a, and the second material layers 121b, and 122b of the first and second Bragg reflection layers 121 and 122 of the band filter unit 120, and silicon, a silicon oxide, and a titanium oxide are respectively used to form the first material layers 131a, 132a, second material layers 131b, 132b, and third material layers 131c, and 132c of the first and second Bragg reflection layers 131 and 132.

In FIG. 4, "A" refers to a transmission spectrum having a wavelength band width w1 when the number of first material layers 121a and 122a and the number of second material layers 121b and 122b are each n (n being an integer equal to or greater than 1) in the band filter unit 120 shown in FIG. 2. In addition, "B" refers to a transmission spectrum having a wavelength band width w2 (<w1) when the number of first material layers 121a and 122a and the number of second material layers 121b and 122b are each n+1 in the band filter unit 120 illustrated in FIG. 2. In addition, "C" refers to the transmission spectrum of the band filter unit 130 illustrated in FIG. 3, which has a wavelength band width w (w2<w<w1). As illustrated in FIG. 4, in the band filter unit 130 illustrated in FIG. 3, the first and second Bragg reflection layers 131 and 132 each include three kinds of material layers having different refractive indexes: the first material layers 131a and 132a, the second material layers 131b and 132b, and the third material layers 131c and 132c, and thus a wavelength band width which ranges between w1 and w2 may be obtained by adjusting the numbers of the first, second, and third material layers 131a, 132a, 131b, 132b, 131c, and 132c.

In the above, each of the first and second Bragg reflection layers 131 and 132 includes three kinds of material layers having different refractive indexes. However, this is a non-limiting example, and each of the first and second Bragg reflection layers 131 and 132 may include, for example, four kinds of material layers having different refractive indexes.

Figure 5:
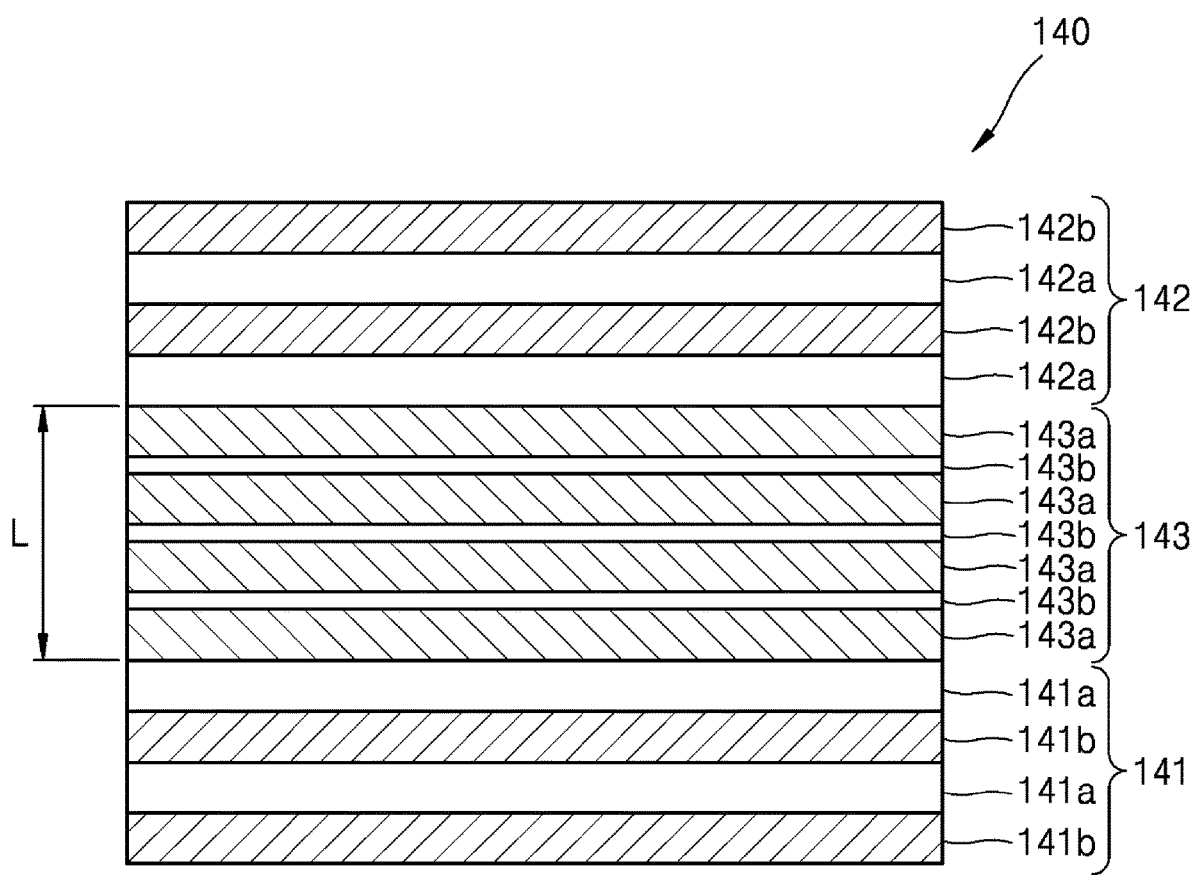
FIG. 5 is a cross-sectional view illustrating another band filter unit that is applicable to the optical filter illustrated in FIG. 1.

FIG. 5 is a cross-sectional view illustrating another band filter unit 140 that is applicable to the optical filter 125 illustrated in FIG. 1.

Referring to FIG. 5, the band filter unit 140 includes: first and second Bragg reflection layers 141 and 142 that are apart from each other; and a cavity layer 143 between the first and second Bragg reflection layers 141 and 142.

The cavity layer 143 may include at least one first material layer 143a and at least one second material layer 143b that have different refractive indexes. Here, the at least one first material layer 143a and the at least one second material layer 143b may be alternately stacked in a vertical direction. FIG. 5 illustrates an example in which four first material layers 143a and three second material layers 143b are alternately stacked. However, this is a non-limiting example, and the numbers of first and second material layers 143a and 143b may be variously selected. The first and second material layers 143a and 143b may include materials having different refractive indexes. For example, the first material layer 143a may include silicon, and the second material layer 143b may include a silicon oxide. However, this is a non-limiting example.

In the above, the cavity layer 143 includes two kinds of material layers, that is, the first and second material layers 143a and 143b, which have different refractive indexes and are stacked in the vertical direction. However, this is a non-limiting example. For example, the cavity layer 143 may include three or more kinds of material layers having different refractive indexes and vertically stacked.

The cavity layer 143 may have a thickness L greater than $\lambda/n$ (where $\lambda$ refers to the center wavelength of the band filter unit 140 and n refers to the effective refractive index of the cavity layer 143). As described above, when the thickness L of the cavity layer 143 is greater than $\lambda/n$, the band filter unit 140 may transmit light having a center wavelength and a desired degree of intensity even if light is incident on the band filter unit 140 at various angles.

The first and second Bragg reflection layers 141 and 142 are respectively provided on lower and upper surfaces of the cavity layer 143, and each of the first and second Bragg reflection layers 141 and 142 may include two or more kinds of material layers 141a, 141b or 142a, 142b having different refractive indexes. FIG. 5 illustrates an example in which each of the first and second Bragg reflection layers 141 and 142 includes two kinds of material layers having different refractive indexes. However, each of the first and second Bragg reflection layers 141 and 142 may have three or more kinds of material layers having different refractive indexes as illustrated in FIG. 3.

Figure 6:
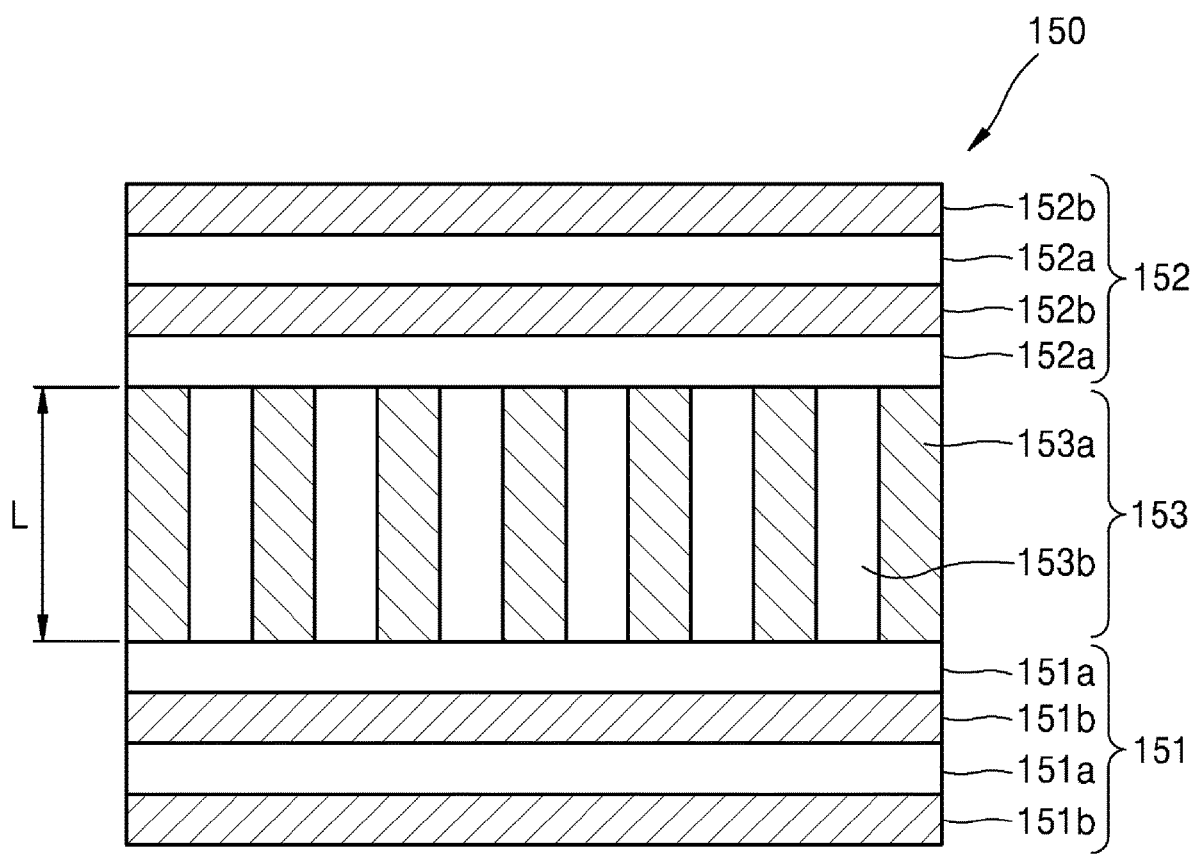
FIG. 6 is a cross-sectional view illustrating another band filter unit that is applicable to the optical filter illustrated in FIG. 1.

FIG. 6 is a cross-sectional view illustrating another band filter unit 150 that is applicable to the optical filter 125 illustrated in FIG. 1.

Referring to FIG. 6, the band filter unit 150 includes: first and second Bragg reflection layers 151 and 152 that are apart from each other; and a cavity layer 153 between the first and second Bragg reflection layers 151 and 152.

The cavity layer 153 may include at least one first material layer 153a and at least one second material layer 153b that have different refractive indexes. Here, the at least one first material layer 153a and the at least one second material layer 153b may be alternately stacked in a horizontal direction.

Here, the numbers of first and second material layers 153a and 153b may be variously selected.

The first and second material layers 153a and 153b may include materials having different refractive indexes. For example, the first material layer 153a may include silicon, and the second material layer 153b may include a silicon oxide. However, this is a non-limiting example, and the first and second material layers 153a and 153b may include various other materials. FIG. 6 illustrates an example in which the cavity layer 153 include two kinds of first and second material layers 153a and 153b having different refractive indexes and alternately arranged in the horizontal direction. However, this is a non-limiting example, and the cavity layer 153 may include three or more kinds of material layers having different refractive indexes and arranged in the horizontal direction. The cavity layer 153 may have a thickness L greater than $\lambda/n$ (where $\lambda$ refers to the center wavelength of the band filter unit 150 and n refers to the effective refractive index of the cavity layer 153).

The first and second Bragg reflection layers 151 and 152 may be respectively provided on lower and upper surfaces of the cavity layer 153, and each of the first and second Bragg reflection layers 151 and 152 may include two or more kinds of material layers having different refractive indexes. FIG. 6 illustrates an example in which each of the first and second Bragg reflection layers 151 and 152 includes two kinds of material layers 151a, 151b or 152a, 152b having different refractive indexes. However, each of the first and second Bragg reflection layers 151 and 152 may have three or more kinds of material layers having different refractive indexes as illustrated in FIG. 3.

Figure 7A:
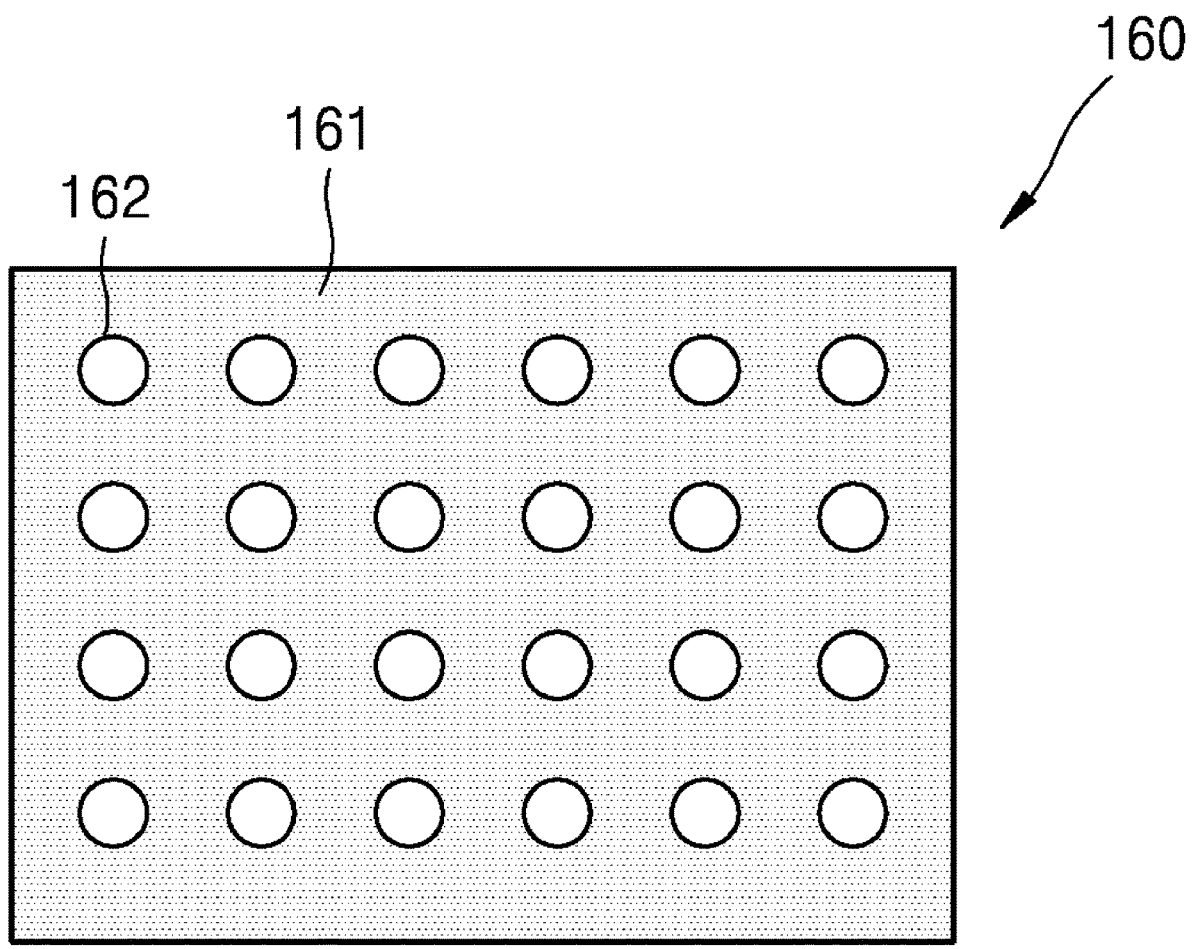
FIGS. 7A and 7B are respectively a plan view and a cross-sectional view illustrating another band filter unit that is applicable to the optical filter illustrated in FIG. 1.
Figure 7B:
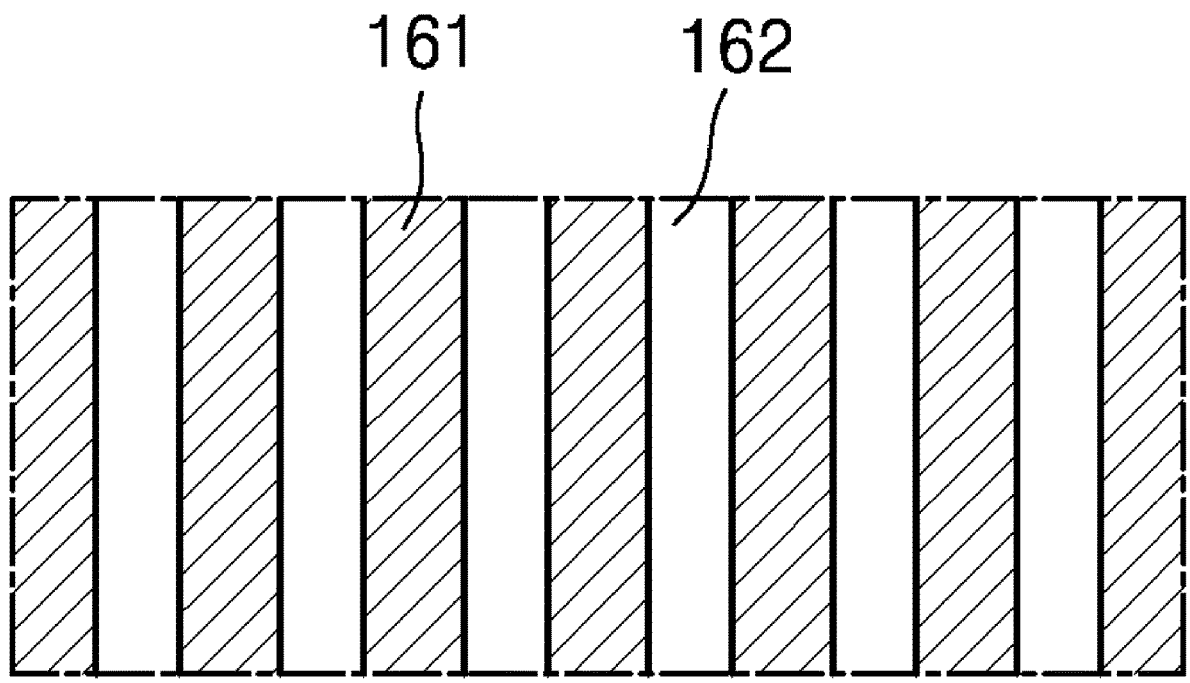

FIGS. 7A and 7B are respectively a plan view and a cross-sectional view illustrating another band filter unit 160 that is applicable to the optical filter 125 illustrated in FIG. 1.

Referring to FIGS. 7A and 7B, the band filter unit 160 may have a photonic crystal structure. The band filter unit 160 includes a first member 161 in which nano-sized through-holes are formed, and a plurality of second members 162 that fill the through-holes. Here, the first member 161 may have a relatively high refractive index, and the second members 162 may have a relatively low refractive index. For example, the second members 162 may include air. In the photonic crystal structure, the wavelength band that passes through the band filter unit 160 may be adjusted by modifying the materials of the first and second members 161 and 162 and the interval between the second members 162.

Figure 8A:
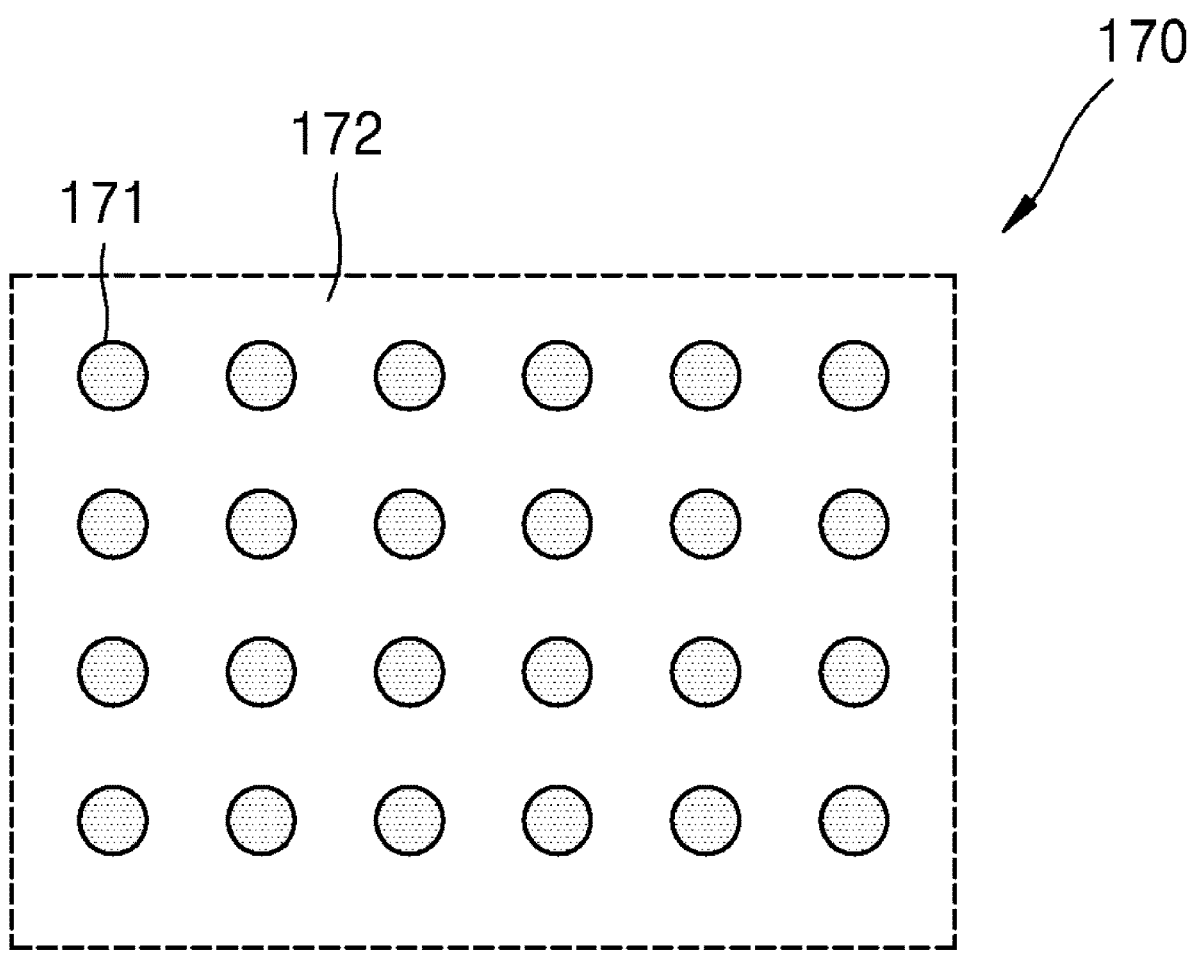
FIGS. 8A and 8B are respectively a plan view and a cross-sectional view illustrating another band filter unit that is applicable to the optical filter illustrated in FIG. 1.
Figure 8B:
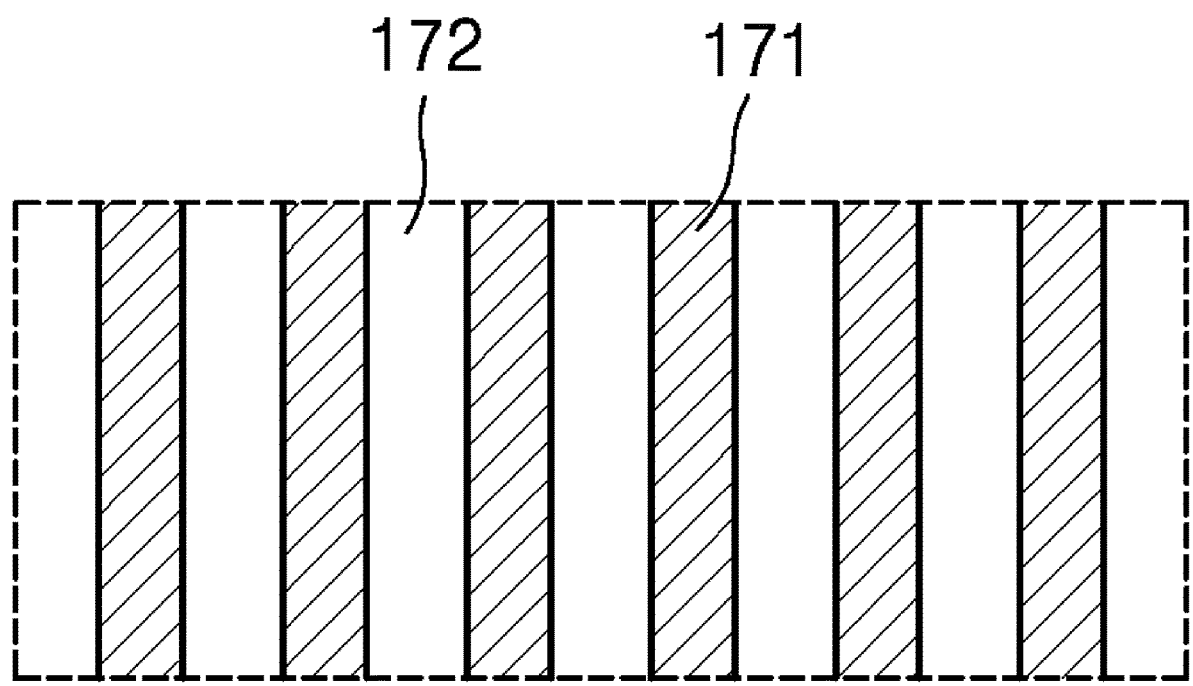

FIGS. 8A and 8B are respectively a plan view and a cross-sectional view illustrating another band filter unit 170 that is applicable to the optical filter 125 illustrated in FIG. 1.

Referring to FIGS. 8A and 8B, the band filter unit 170 may have a nano-post structure. The band filter unit 170 includes: a plurality of first members 171 having a nano-size and arranged in a given shape; and a second member 172 surrounding the first members 171. Here, the first members 171 may have a relatively high refractive index, and the second member 172 may have a relatively low refractive index. For example, the second member 172 may include air. In the nano-post structure, the wavelength band that passes through the band filter unit 170 may be adjusted by modifying the materials of the first and second members 171 and 172 and the interval between the first members 171.

Referring back to FIG. 1, the imaging lens array 185 including a plurality of lens units 180 is provided on an upper surface of the transparent substrate 190. Here, the lens units 180 correspond to the band filter units 120. Accordingly, the lens units 180 may be arranged in a two-dimensional or one-dimensional form on the upper surface of the transparent substrate 190.

Each of the lens units 180 may perform single-wavelength imaging in a given region of the sensing device 110. Each of the lens units 180 may include one convex lens. Here, a specific lens unit 180 may form an image focus in a given region of the sensing device 110 through a corresponding band filter unit 120, and thus imaging at a specific wavelength corresponding to the center wavelength of the corresponding band filter unit 120 may be possible in the given region of the sensing device 110. For example, when the sensing device 110 is divided into 4×4 regions (that is, 16 regions) and the lens units 180 and the band filter units 120 are provided corresponding to the regions of the sensing device 110, sixteen spectral images having different wavelengths may be simultaneously formed in the regions of the sensing device 110.

In addition, a light blocking layer 145 may be further provided between the lens units 180 to block portions of the transparent substrate 190 through which light does not pass. The light blocking layer 145 may include, for example, a metallic material, but is not limited thereto.

In the spectral imaging apparatus 100 shown in FIG. 1, the lens units 180 of the imaging lens array 185 respectively correspond to the band filter units 120 each being a single-wavelength band filter unit and having a relatively large area such that the lens units 180 and the band filter units 120 may be easily fabricated and optical crosstalk may be prevented between the band filter units 120 having different center wavelengths. In addition, the imaging lens array 185 and the optical filter 125 may be integrated on the transparent substrate 190, which is apart from the sensing device 110.

Figure 9:
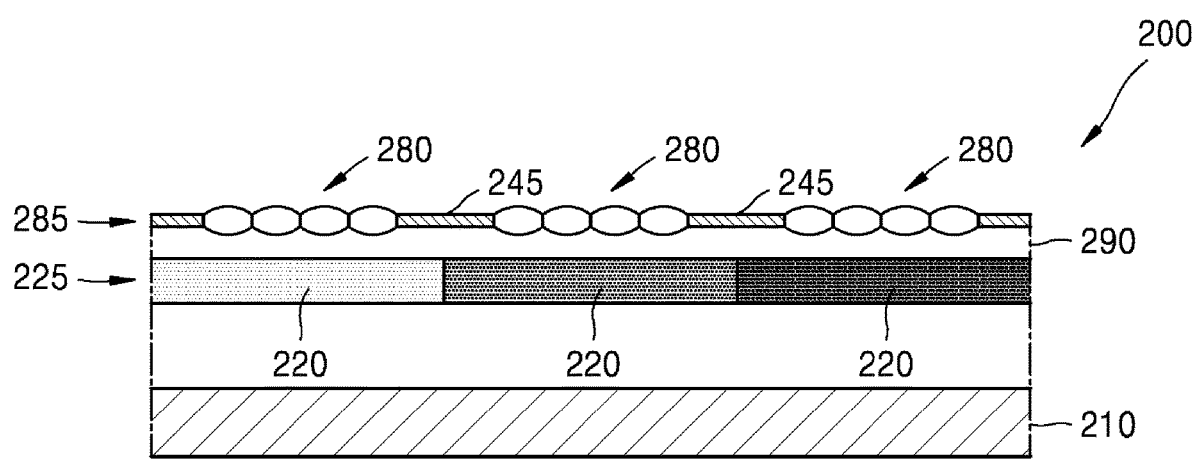
FIG. 9 is a cross-sectional view illustrating a spectral imaging apparatus according to another example embodiment.

FIG. 9 is a cross-sectional view illustrating a spectral imaging apparatus 200 according to another example embodiment. Hereinafter, differences from the spectral imaging apparatus 100 illustrated in FIG. 1 will be mainly described.

In the spectral imaging apparatus 200 illustrated in FIG. 9, an optical filter 225 and an imaging lens array 285 are provided on a transparent substrate 290, which is apart from a sensing device 210. The optical filter 225 including a plurality of band filter units 220 is provided on a lower surface of the transparent substrate 290, and the imaging lens array 285 including a plurality of lens units 280 is provided on an upper surface of the transparent substrate 290.

The lens units 280 may be arranged on the upper surface of the transparent substrate 290 and may correspond to the band filter units 220. Here, each of the lens units 280 may include a plurality of convex lenses.

A specific lens unit 280 including a plurality of convex lenses may perform imaging at a single wavelength corresponding to the center wavelength of a corresponding band filter unit 220. A light blocking layer 245 may be further provided between the lens units 280. According to the current example embodiment, each of the lens units 280 includes a plurality of convex lenses such that the thickness of the lens units 280 may be reduced for a more compact structure.

Figure 10:
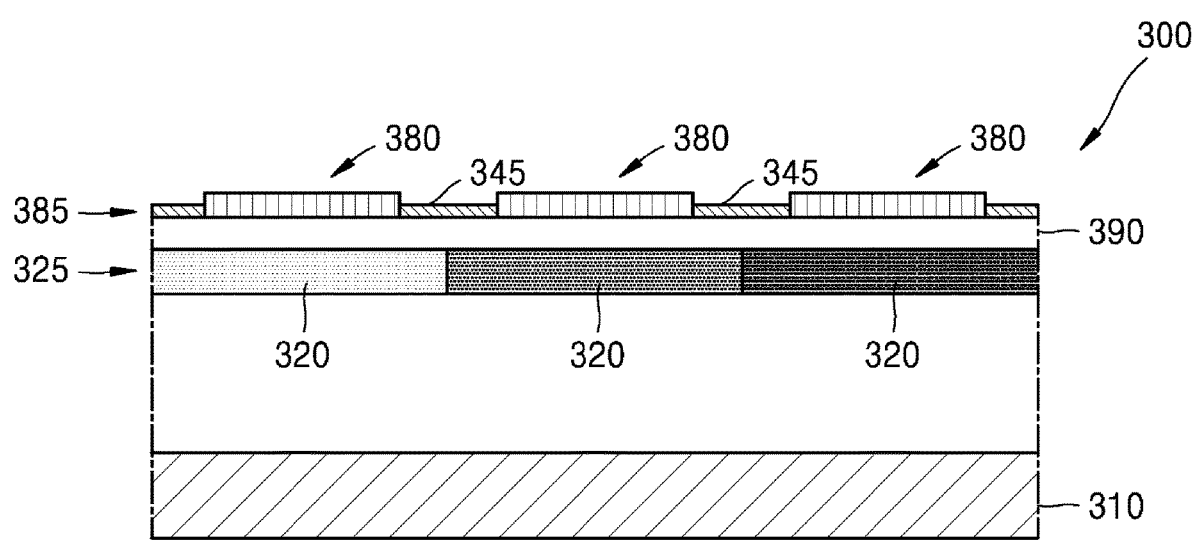
FIG. 10 is a cross-sectional view illustrating a spectral imaging apparatus according to another example embodiment.

FIG. 10 is a cross-sectional view illustrating a spectral imaging apparatus 300 according to another example embodiment.

In the spectral imaging apparatus 300 illustrated in FIG. 10, an optical filter 325 and an imaging lens array 385 are provided on a transparent substrate 390, which is apart from a sensing device 310. The optical filter 325 including a plurality of band filter units 320 is provided on a lower surface of the transparent substrate 390, and the imaging lens array 385 including a plurality of lens units 380 is provided on an upper surface of the transparent substrate 390.

The lens units 380 may be arranged on the upper surface of the transparent substrate 390 and may correspond to the band filter units 320. Here, each of the lens units 380 may include a flat lens. The flat lens refers to a lens which has a flat shape and a refractive index varying in a center-to-edge direction for focusing light.

A specific lens unit 380 including a flat lens may perform imaging at a single wavelength corresponding to the center wavelength of a corresponding band filter unit 320. A light blocking layer 345 may be further provided between the lens units 380. According to the current example embodiment, each of the lens units 380 includes the flat lens such that the thickness of the lens units 380 may be reduced for a more compact structure.

Figure 11:
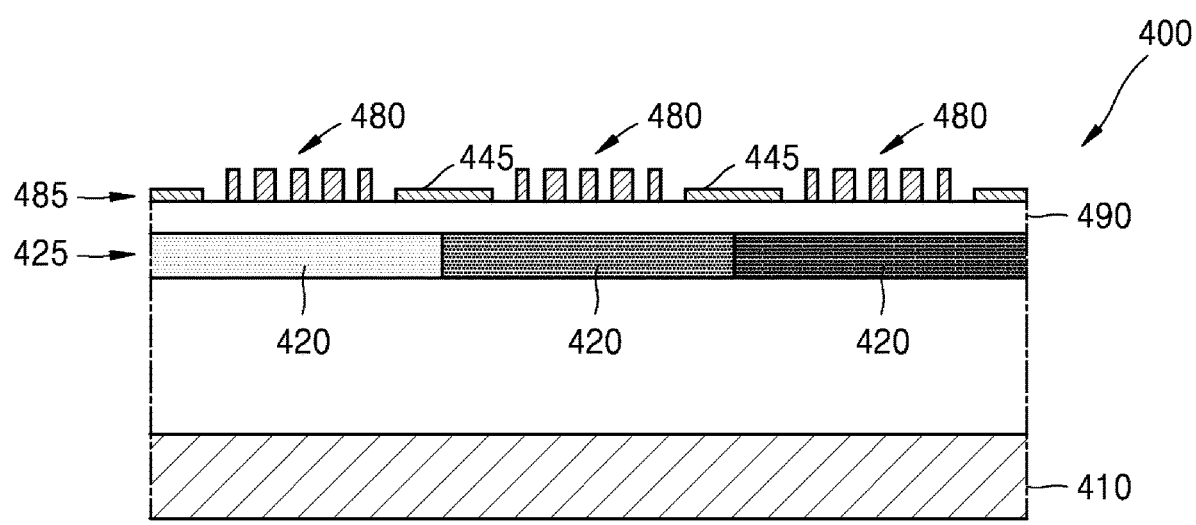
FIG. 11 is a cross-sectional view illustrating a spectral imaging apparatus according to another example embodiment.

FIG. 11 is a cross-sectional view illustrating a spectral imaging apparatus 400 according to another example embodiment.

In the spectral imaging apparatus 400 illustrated in FIG. 11, an optical filter 425 and an imaging lens array 485 are provided on a transparent substrate 490, which is apart from a sensing device 410. The optical filter 425 including a plurality of band filter units 420 is provided on a lower surface of the transparent substrate 490, and the imaging lens array 485 including a plurality of lens units 480 is provided on an upper surface of the transparent substrate 490.

The lens units 480 may be arranged on the upper surface of the transparent substrate 490 and may correspond to the band filter units 420. Here, each of the lens units 480 may include a meta lens. The meta lens includes nanopatterns arranged in a given shape to focus light. For example, the nanopatterns may include, but are not limited to, silicon (Si), TiO2, SiO2, or the like.

A lens unit 480 including a meta lens may perform imaging at a single wavelength corresponding to the center wavelength of a corresponding band filter unit 420. A light blocking layer 445 may be further provided between the lens units 480. According to the current example embodiment, each of the lens units 480 includes the meta lens such that the lens units 480 may have a compact structure.

Figure 12:
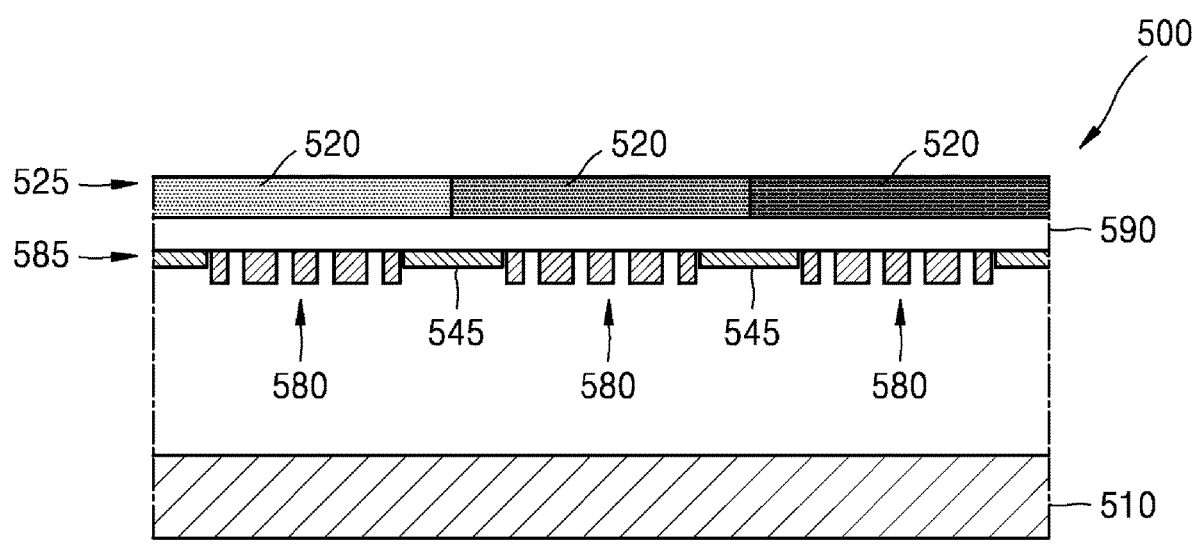
FIG. 12 is a cross-sectional view illustrating a spectral imaging apparatus according to another example embodiment.

FIG. 12 is a cross-sectional view illustrating a spectral imaging apparatus 500 according to another example embodiment.

In the spectral imaging apparatus 500 illustrated in FIG. 12, an optical filter 525 and an imaging lens array 585 are provided on a transparent substrate 590, which is apart from a sensing device 510. The optical filter 525 including a plurality of band filter units 520 is provided on an upper surface of the transparent substrate 590, and the imaging lens array 585 including a plurality of lens units 580 is provided on a lower surface of the transparent substrate 590. A light blocking layer 545 may be further provided between the lens units 580. FIG. 12 illustrates an example in which each of the lens units 580 includes a meta lens. However, this is a non-limiting example, and each of the lens units 580 may include at least one convex lens or flat lens.

In each of the above example embodiments, one of the optical filter and the imaging lens array is provided on the upper surface of the transparent substrate, and the other is provided on the lower surface of the transparent substrate. However, the disclosure is not limited thereto, and as described later, both the optical filter and the imaging lens array may be provided on the upper surface or lower surface of the transparent substrate.

Figure 13:
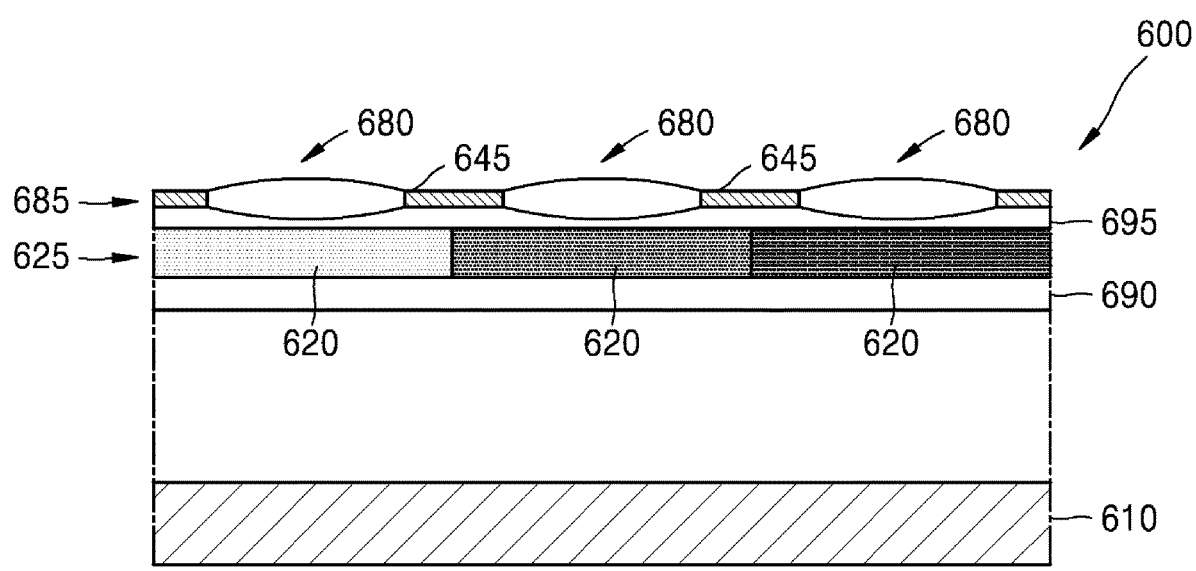
FIG. 13 is a cross-sectional view illustrating a spectral imaging apparatus according to another example embodiment.

FIG. 13 is a cross-sectional view illustrating a spectral imaging apparatus 600 according to another example embodiment.

In the spectral imaging apparatus 600 illustrated in FIG. 13, an optical filter 625 and an imaging lens array 685 are provided on a transparent substrate 690, which is apart from a sensing device 610. The optical filter 625, which includes a plurality of band filter units 620, is provided on an upper surface of the transparent substrate 690. In addition, an intermediate layer 695 is provided on an upper surface of the optical filter 625, and the imaging lens array 685 including a plurality of lens units 680 is provided on an upper surface of the intermediate layer 695. Here, the lens units 680 correspond to the band filter units 620. The intermediate layer 695 is provided for optical separation between the optical filter 625 and the imaging lens array 685 and may include, for example, a low refractive material such as for example, a silicon oxide. A light blocking layer 645 may be further provided between the lens units 680.

FIG. 13 illustrates an example in which each of the lens units 680 of the imaging lens array 685 includes one convex lens. However, this is a non-limiting example, and each of the lens units 680 may include a plurality of lenses of various types such as convex, flat, or meta lenses.

Figure 14:
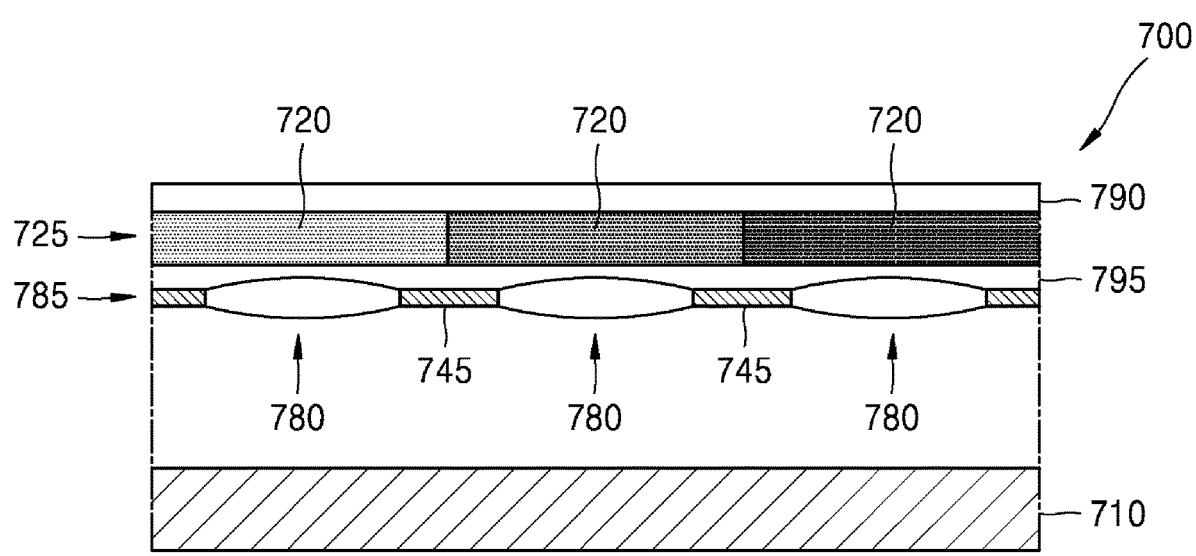
FIG. 14 is a cross-sectional view illustrating a spectral imaging apparatus according to another example embodiment.

FIG. 14 is a cross-sectional view illustrating a spectral imaging apparatus 700 according to another example embodiment.

In the spectral imaging apparatus 700 illustrated in FIG. 14, an optical filter 725 and an imaging lens array 785 are provided on a transparent substrate 790, which is apart from a sensing device 710. The optical filter 725, which includes a plurality of band filter units 720, is provided on a lower surface of the transparent substrate 790. In addition, an intermediate layer 795 is provided on a lower surface of the optical filter 725, and the imaging lens array 785 including a plurality of lens units 780 is provided on a lower surface of the intermediate layer 795. Here, the lens units 780 correspond to the band filter units 720. A light blocking layer 745 may be further provided between the lens units 780.

FIG. 14 illustrates an example in which each of the lens units 780 of the imaging lens array 785 includes one convex lens. However, this is a non-limiting example, and each of the lens units 780 may include a plurality of lenses of various types such as convex, flat, or meta lenses.

In each of the above example embodiments, both the optical filter and the imaging lens array are provided on the transparent substrate. However, in other example embodiments as illustratively described below, one of the optical filter and the imaging lens array may be provided on the transparent substrate, and the other may be provided on the sensing device.

Figure 15:
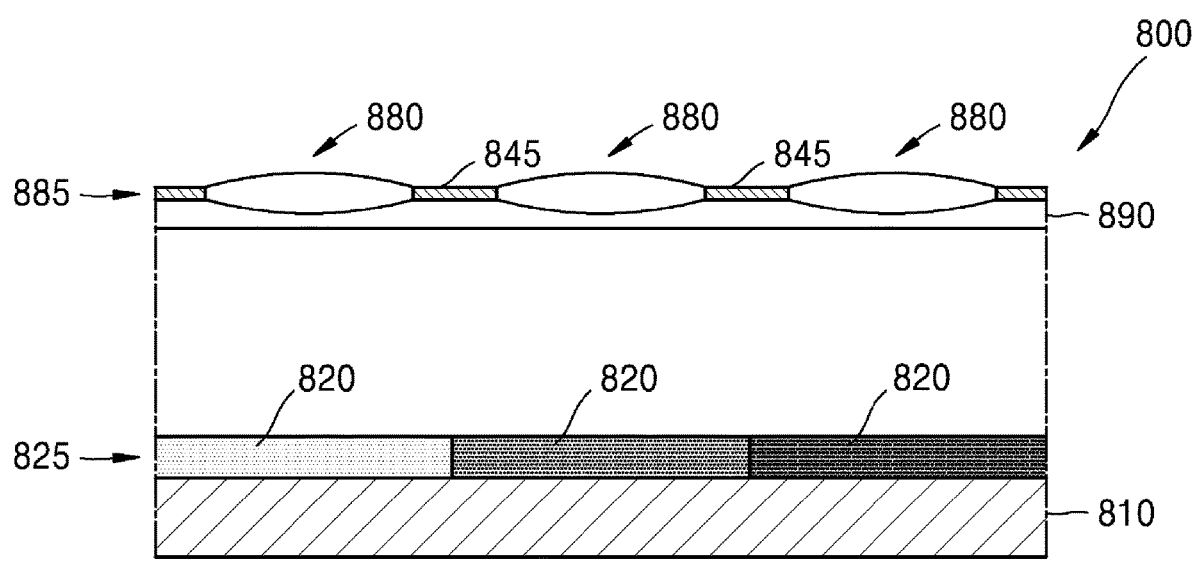
FIG. 15 is a cross-sectional view illustrating a spectral imaging apparatus according to another example embodiment.

FIG. 15 is a cross-sectional view illustrating a spectral imaging apparatus 800 according to another example embodiment.

Referring to FIG. 15, the spectral imaging apparatus 800 includes a sensing device 810, an optical filter 825, and an imaging lens array 885. Here, the optical filter 825 is provided on the sensing device 810, and the imaging lens array 885 is provided on a transparent substrate 890, which is apart from the sensing device 810.

The optical filter 825, which includes a plurality of band filter units 820, is provided on an upper surface of the sensing device 810. In addition, the imaging lens array 885 including a plurality of lens units 880 is provided on an upper surface of the transparent substrate 890. Here, the lens units 880 correspond to the band filter units 820. A light blocking layer 845 may be further provided between the lens units 880.

FIG. 15 illustrates an example in which the imaging lens array 885 is provided on the upper surface of the transparent substrate 890. However, this is a non-limiting example, and the imaging lens array 885 may be provided on a lower surface of the transparent substrate 890. In addition, FIG. 15 illustrates an example in which each of the lens units 880 of the imaging lens array 885 includes one convex lens. However, this is a non-limiting example, and each of the lens units 880 may include a plurality of lenses of various types such as convex, flat, or meta lenses.

Figure 16:
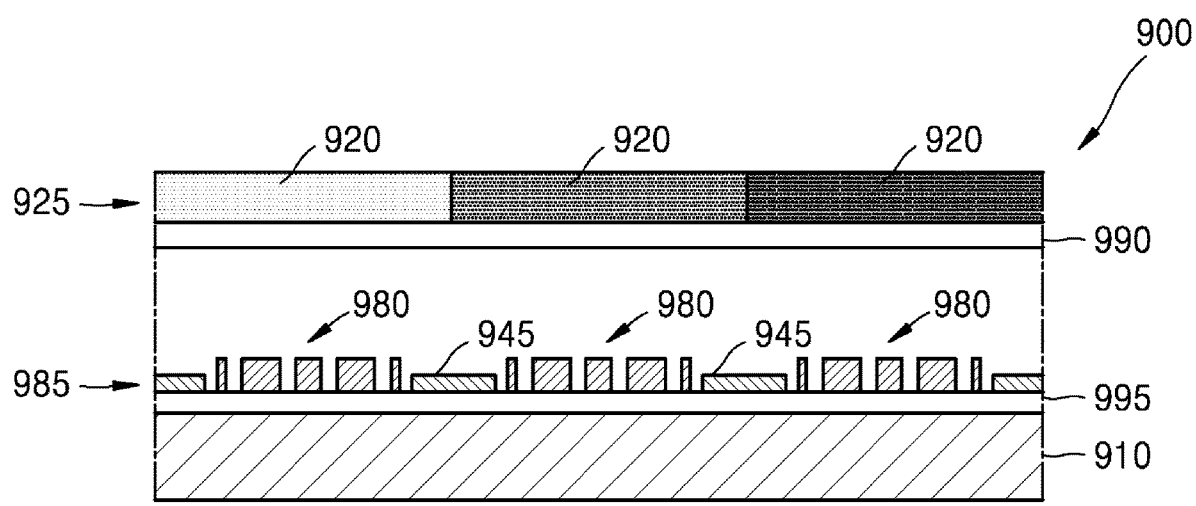
FIG. 16 is a cross-sectional view illustrating a spectral imaging apparatus according to another example embodiment.

FIG. 16 is a cross-sectional view illustrating a spectral imaging apparatus 900 according to another example embodiment.

In the spectral imaging apparatus 900 illustrated in FIG. 16, an optical filter 925 is provided on a transparent substrate 990, which is apart from a sensing device 910, and an imaging lens array 985 is provided on the sensing device 910. The optical filter 925, which includes a plurality of band filter units 920, is provided on an upper surface of the transparent substrate 990. In addition, an intermediate layer 995 may be provided on an upper surface of the sensing device 910, and the imaging lens array 985 including a plurality of lens units 980 may be provided on an upper surface of the intermediate layer 995. Here, the lens units 980 correspond to the band filter units 920. A light blocking layer 945 may be further provided between the lens units 980.

FIG. 16 illustrates an example in which the optical filter 925 is provided on the upper surface of the transparent substrate 990. However, this is a non-limiting example, and the optical filter 925 may be provided on a lower surface of the transparent substrate 990. In addition, FIG. 16 illustrates an example in which each of the lens units 980 of the imaging lens array 985 includes a meta lens. However, this is a non-limiting example, and each of the lens units 980 may include at least one convex or flat lens.

In each of the above example embodiments, at least one of the optical filter and the imaging lens array is provided on the transparent substrate, which is apart from the sensing device. However, in other example embodiments as illustratively described later, the optical filter and the imaging lens array may be monolithically integrated on the sensing device.

Figure 17:
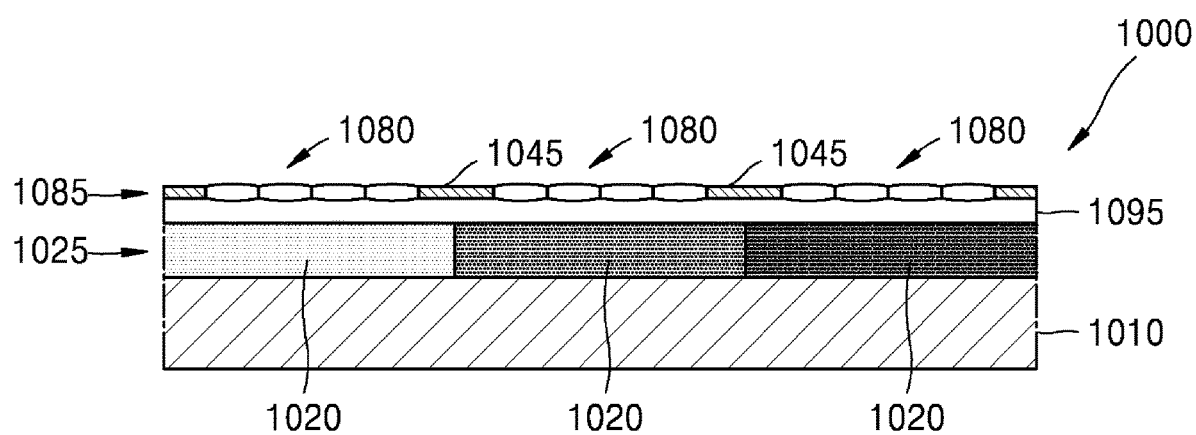
FIG. 17 is a cross-sectional view illustrating a spectral imaging apparatus according to another example embodiment.

FIG. 17 is a cross-sectional view illustrating a spectral imaging apparatus 1000 according to another example embodiment.

Referring to FIG. 17, the spectral imaging apparatus 1000 includes a sensing device 1010, an optical filter 1025, and an imaging lens array 1085. Here, the optical filter 1025 and the imaging lens array 1085 are monolithically integrated on the sensing device 1010.

The optical filter 1025, which includes a plurality of band filter units 1020, is provided on an upper surface of the sensing device 1010. In addition, an intermediate layer 1095 is provided on an upper surface of the optical filter 1025, and the imaging lens array 1085 including a plurality of lens units 1080 is provided on an upper surface of the intermediate layer 1095. Here, the lens units 1080 correspond to the band filter units 1020. The intermediate layer 1095 is provided for optical separation between the optical filter 1025 and the imaging lens array 1085 and may include, for example, a low refractive material such as a silicon oxide. A light blocking layer 1045 may be further provided between the lens units 1080.

FIG. 17 illustrates an example in which each of the lens units 1080 of the imaging lens array 1085 includes a plurality of convex lenses. However, this is a non-limiting example, and each of the lens units 1080 may include one convex, flat, or meta lens. According to the current example embodiment, the optical filter 1025 and the imaging lens array 1085 are monolithically integrated on the sensing device 1010 such that the spectral imaging apparatus 1000 may have a compact structure.

Figure 18:
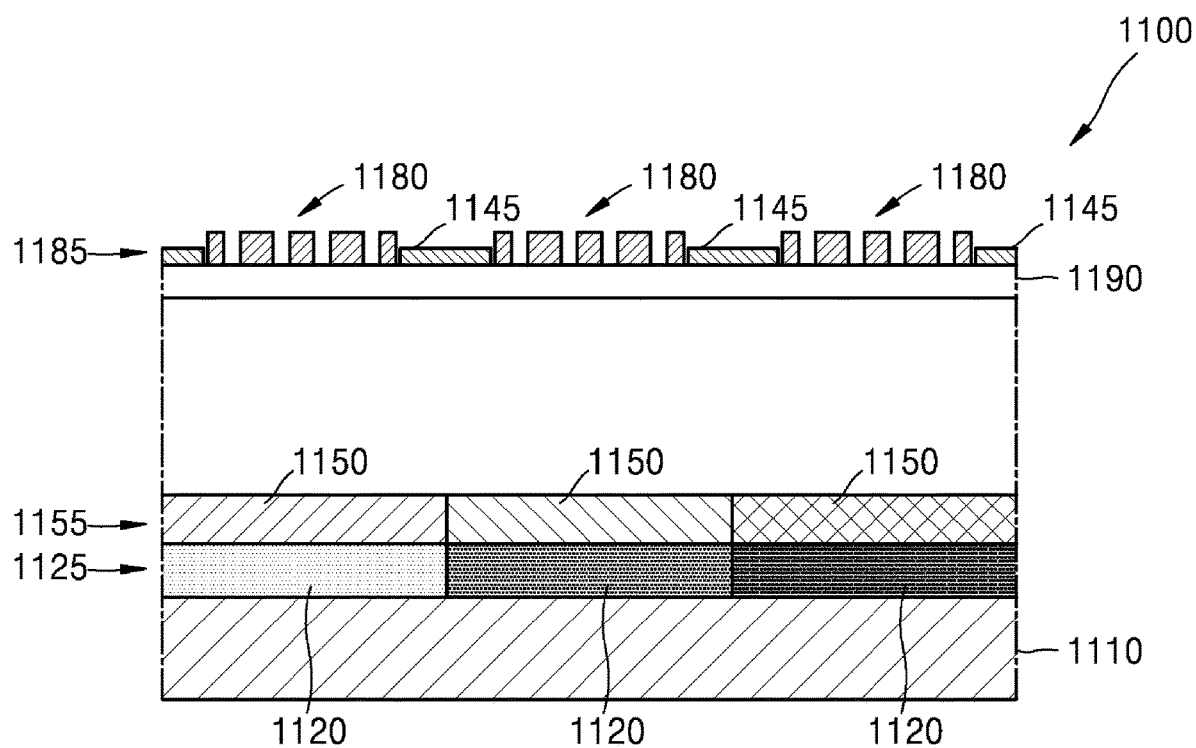
FIG. 18 is a cross-sectional view illustrating a spectral imaging apparatus according to another example embodiment.

FIG. 18 is a cross-sectional view illustrating a spectral imaging apparatus 1100 according to another example embodiment.

Referring to FIG. 18, the spectral imaging apparatus 1100 includes a sensing device 1110, an optical filter 1125, an additional filter 1155, and an imaging lens array 1185. Here, the optical filter 1125 and the additional filter 1155 are provided on the sensing device 1110, and the imaging lens array 1185 is provided on a transparent substrate 1190, which is apart from the sensing device 1110.

The optical filter 1125, which includes a plurality of band filter units 1120, is provided on an upper surface of the sensing device 1110, and the additional filter 1155, which includes a plurality of additional filter units 1150, is provided on an upper surface of the optical filter 1125. Here, the additional filter units 1150 correspond to the band filter units 1120.

Each of the additional filter units 1150 may transmit only a specific wavelength band (or a target wavelength band) to a corresponding band filter unit 1120. The band filter units 1120 may transmit other wavelength bands in addition to target wavelength bands, and in this case, owing to the additional filter units 1150 provided to the band filter units 1120, only the target wavelength bands may pass through the band filter units 1120.

The additional filter units 1150 may include, for example, a plurality of color filter units or a plurality of broadband filter units. For example, color filters, which are commonly applied to color display apparatuses, such as liquid crystal displays or organic light emitting displays may be used as the color filter units. The broadband filter units may have, for example, a multi-cavity structure or a metal mirror structure.

The imaging lens array 1185 including a plurality of lens units 1180 is provided on an upper surface of the transparent substrate 1190. Here, the lens units 1180 correspond to the band filter units 1120. A light blocking layer 1145 may be further provided between the lens units 1180.

FIG. 18 illustrates an example in which the optical filter 1125 is provided on the upper surface of the sensing device 1110 and the additional filter 1155 is provided on the upper surface of the optical filter 1125. However, this is a non-limiting example. In another example, the additional filter 1155 may be provided on the upper surface of the sensing device 1110, and the optical filter 1125 may be provided on an upper surface of the additional filter 1155. In addition, FIG. 18 illustrates an example in which the imaging lens array 1185 is provided on the upper surface of the transparent substrate 1190. However, this is a non-limiting example, and the imaging lens array 1185 may be provided on a lower surface of the transparent substrate 1190. In addition, FIG. 18 illustrates an example in which each of the lens units 1180 includes a meta lens. However, this is a non-limiting example, and each of the lens units 1180 may include at least one convex lens or flat lens.

Figure 19:
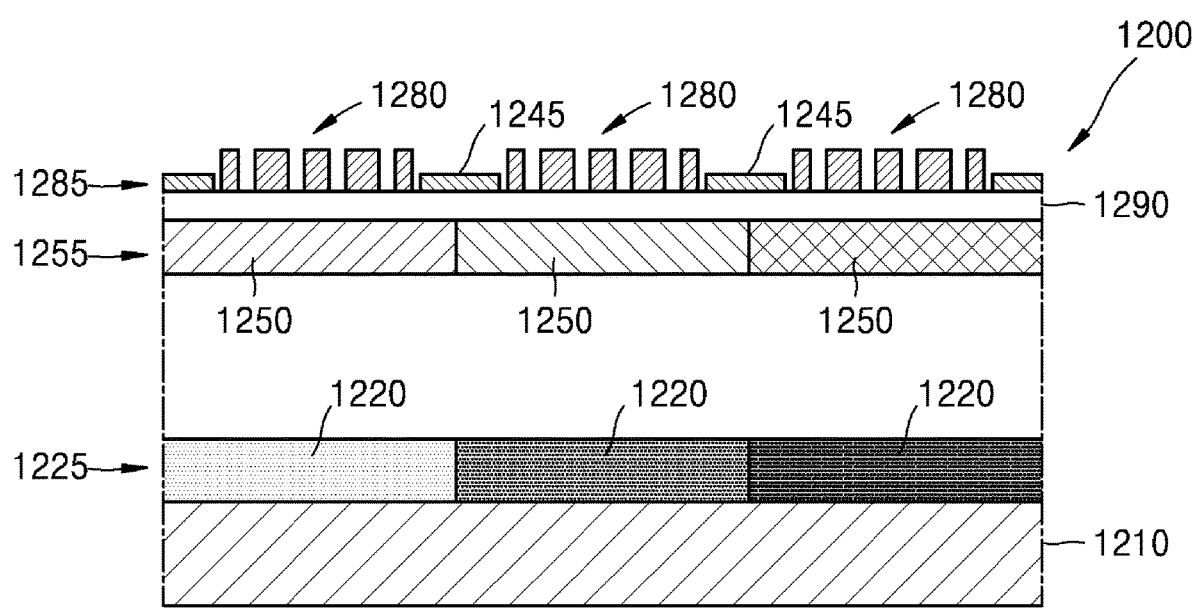
FIG. 19 is a cross-sectional view illustrating a spectral imaging apparatus according to another example embodiment.

FIG. 19 is a cross-sectional view illustrating a spectral imaging apparatus 1200 according to another example embodiment.

In the spectral imaging apparatus 1200 illustrated in FIG. 19, an optical filter 1225 is provided on a sensing device 1210, and an additional filter 1255 and an imaging lens array 1285 are provided on a transparent substrate 1290, which is apart from the sensing device 1210.

For example, the optical filter 1225, which includes a plurality of band filter units 1220, is provided on an upper surface of the sensing device 1210. The additional filter 1255, which includes a plurality of additional filter units 1250 configured to transmit only specific wavelength bands, is provided on a lower surface of the transparent substrate 1290. Here, the additional filter units 1250 correspond to the band filter units 1220. In addition, the imaging lens array 1285 including a plurality of lens units 1280 is provided on an upper surface of the transparent substrate 1290. Here, the lens units 1280 correspond to the band filter units 1220. A light blocking layer 1245 may be further provided between the lens units 1280.

FIG. 19 illustrates an example in which the additional filter 1255 is provided on the lower surface of the transparent substrate 1290 and the imaging lens array 1285 is provided on the upper surface of the transparent substrate 1290. However, this is a non-limiting example, and the imaging lens array 1285 may be provided on the lower surface of the transparent substrate 1290, and the additional filter 1255 may be provided on the upper surface of the transparent substrate 1290. In addition, both the additional filter 1255 and the imaging lens array 1285 may be provided on the upper surface of the transparent substrate 1290 or on the lower surface of the transparent substrate 1290. In addition, FIG. 19 illustrates an example in which each of the lens units 1280 includes a meta lens. However, this is a non-limiting example, and each of the lens units 1280 may include at least one convex lens or flat lens.

Figure 20:
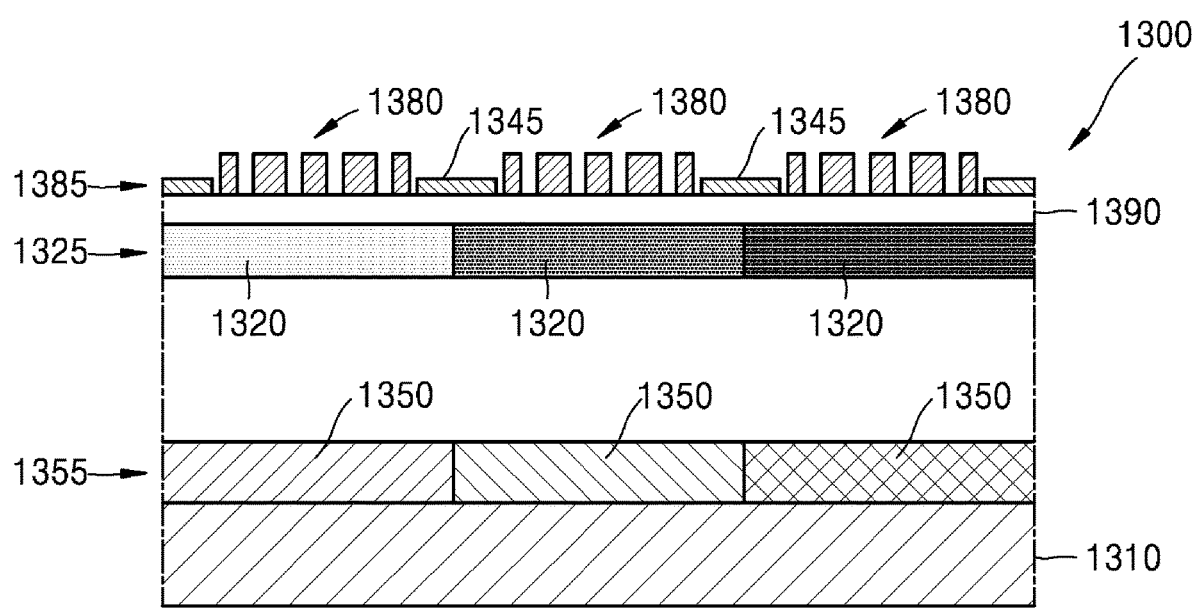
FIG. 20 is a cross-sectional view illustrating a spectral imaging apparatus according to another example embodiment.

FIG. 20 is a cross-sectional view illustrating a spectral imaging apparatus 1300 according to another example embodiment.

In the spectral imaging apparatus 1300 illustrated in FIG. 20, an additional filter 1355 is provided on a sensing device 1310, and an optical filter 1325 and an imaging lens array 1385 are provided on a transparent substrate 1390, which is apart from the sensing device 1310.

For example, the additional filter 1355, which includes a plurality of additional filter units 1350 configured to transmit only specific wavelength bands, is provided on an upper surface of the sensing device 1310. The optical filter 1325, which includes a plurality of band filter units 1320, is provided on a lower surface of the transparent substrate 1390. Here, the additional filter units 1350 correspond to the band filter units 1320. In addition, the imaging lens array 1385 including a plurality of lens units 1380 is provided on an upper surface of the transparent substrate 1390. Here, the lens units 1380 correspond to the band filter units 1320. A light blocking layer 1345 may be further provided between the lens units 1380.

FIG. 20 illustrates an example in which the optical filter 1325 is provided on the lower surface of the transparent substrate 1390 and the imaging lens array 1385 is provided on the upper surface of the transparent substrate 1390. However, this is a non-limiting example, and the imaging lens array 1385 may be provided on the lower surface of the transparent substrate 1390, and the optical filter 1325 may be provided on the upper surface of the transparent substrate 1390. In addition, both the optical filter 1325 and the imaging lens array 1385 may be provided on the upper surface of the transparent substrate 1390 or on the lower surface of the transparent substrate 1390. In addition, FIG. 20 illustrates an example in which each of the lens units 1380 includes a meta lens. However, this is a non-limiting example, and each of the lens units 1380 may include at least one convex lens or flat lens.

Figure 21:
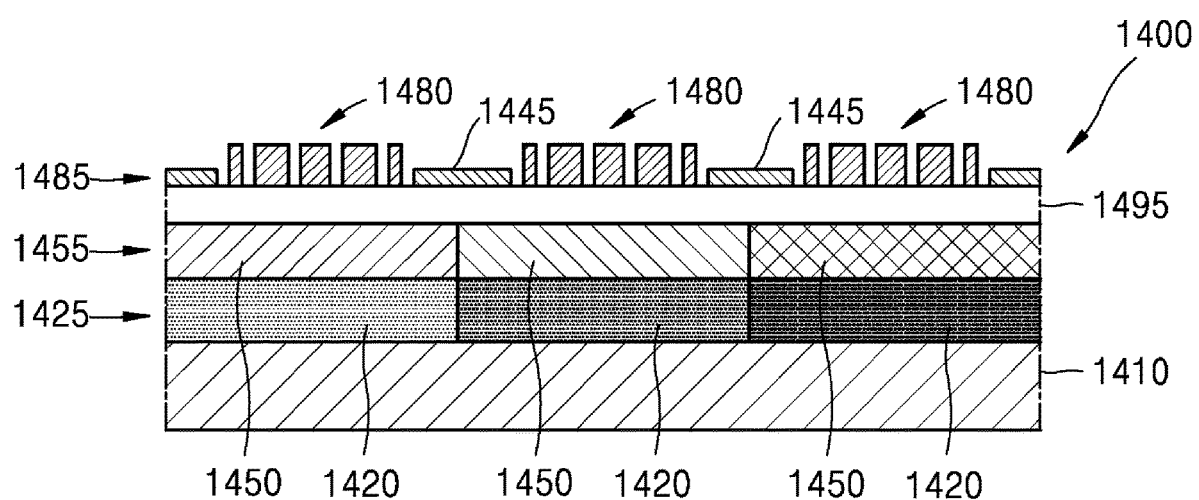
FIG. 21 is a cross-sectional view illustrating a spectral imaging apparatus according to another example embodiment.

FIG. 21 is a cross-sectional view illustrating a spectral imaging apparatus 1400 according to another example embodiment.

Referring to FIG. 21, the spectral imaging apparatus 1400 includes a sensing device 1410, an optical filter 1425, an additional filter 1455, and an imaging lens array 1485. Here, the optical filter 1425, the additional filter 1455, and the imaging lens array 1485 are monolithically integrated on the sensing device 1410.

For example, the optical filter 1425, which includes a plurality of band filter units 1420, is provided on an upper surface of the sensing device 1410, and the additional filter 1455, which includes a plurality of additional filter units 1450, is provided on an upper surface of the optical filter 1425. Here, the additional filter units 1450 correspond to the band filter units 1420. In addition, an intermediate layer 1495 is provided on an upper surface of the additional filter 1455, and the imaging lens array 1485 including a plurality of lens units 1480 is provided on an upper surface of the intermediate layer 1495. Here, the lens units 1480 correspond to the band filter units 1420. In addition, a light blocking layer 1445 may be provided between the lens units 1480.

FIG. 21 illustrates an example in which the optical filter 1425 is provided on the upper surface of the sensing device 1410 and the additional filter 1455 is provided on the upper surface of the optical filter 1425. However, this is a non-limiting example. In another example, the additional filter 1455 may be provided on the upper surface of the sensing device 1410, and the optical filter 1425 may be provided on the upper surface of the additional filter 1455. In addition, FIG. 21 illustrates an example in which each of the lens units 1480 of the imaging lens array 1485 includes a plurality of convex lenses. However, this is a non-limiting example, and each of the lens units 1480 may include one convex, flat, or meta lens. According to the current example embodiment, the optical filter 1425, the additional filter 1455, and the imaging lens array 1485 are monolithically integrated on the sensing device 1410 such that the spectral imaging apparatus 1400 may have a compact structure.

As described above, according to the one or more of the above example embodiments, the lens units of the imaging lens array respectively correspond to the single-wavelength band filter units each having a relatively large area, thereby making it easy to fabricate the lens units and the band filter units and preventing optical crosstalk between the band filter units having different center wavelengths. In addition, at least one of the imaging lens array and the optical filter may be integrated on the transparent substrate which is apart from the sensing device, or both the imaging lens array and the optical filter may be monolithically integrated on the sensing device.

It should be understood that embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. An image sensing device comprising:
an optical filter comprising a plurality of band filter units, the plurality of band filter units having different center wavelengths;
a sensor configured to receive light passing through the optical filter, and convert the light into an electrical signal to perform imaging of an object;
an imaging lens array which is apart from the optical filter, comprising a plurality of lens units which respectively correspond to the plurality of band filter units, the plurality of lens units forming a focus of the imaging of the sensor; and
a light blocking layer provided between the plurality of lens units,
wherein the light blocking layer is provided at positions corresponding to boundaries between the plurality of band filter units.

2. The image sensing device of claim 1, wherein the optical filter and the imaging lens array are apart from the sensor.

3. The image sensing device of claim 1, wherein the optical filter is provided on the sensor.

4. The image sensing device of claim 1, wherein the imaging lens array is provided on the sensor.

5. The image sensing device of claim 1, further comprising an additional filter, which comprises a plurality of additional filter units, the plurality of additional filter units respectively corresponding to the plurality of band filter units and configured to transmit specific wavelength bands.

6. The image sensing device of claim 5, wherein the plurality of additional filter units comprise a plurality of color filter units or a plurality of broadband filter units.

7. The image sensing device of claim 1, wherein each of the plurality of lens units comprises at least one convex lens.

8. The image sensing device of claim 1, wherein each of the plurality of lens units comprises a flat lens or a meta lens.

9. The image sensing device of claim 1, wherein each of the plurality of band filter units comprises:
a cavity layer; and
Bragg reflection layers respectively provided on an upper surface and a lower surface of the cavity layer.

10. The image sensing device of claim 9, wherein the cavity layer comprises a single material layer or a plurality of material layers having different refractive indexes.

11. The image sensing device of claim 9, wherein the cavity layer has a thickness greater than $\lambda/n$, where $\lambda$ refers to a center wavelength of a corresponding band filter unit, and n refers to an effective refractive index of the cavity layer.

12. The image sensing device of claim 9, wherein the Bragg reflection layers comprise at least three material layers having different refractive indexes.

13. The image sensing device of claim 1, wherein each of the plurality of band filter units has a photonic crystal structure or a nano-post structure.

14. The image sensing device of claim 1, wherein the sensor comprises an image sensor or a photodiode.

* * * * *